(12) United States Patent
Yang et al.

(10) Patent No.: US 11,509,092 B2
(45) Date of Patent: Nov. 22, 2022

(54) ELECTRON-DEVICE PROTECTION CASING USING MAGNETIC CONNECTION

(71) Applicants: Sampson Yang, Irvine, CA (US); Yun-Chang Tsui, Taipei (TW); Che-Wei Lin, Taipei (TW)

(72) Inventors: Sampson Yang, Irvine, CA (US); Yun-Chang Tsui, Taipei (TW); Che-Wei Lin, Taipei (TW)

(73) Assignee: The Joy Factory, Inc., Irvine, CA (US)

( * ) Notice: Subject to any disclaimer, the term of this patent is extended or adjusted under 35 U.S.C. 154(b) by 0 days.

(21) Appl. No.: 17/213,260

(22) Filed: Mar. 26, 2021

(65) Prior Publication Data
US 2022/0311180 A1 Sep. 29, 2022

(51) Int. Cl.
| | |
|---|---|
| *G06F 1/16* | (2006.01) |
| *H04B 1/3888* | (2015.01) |
| *H01R 13/62* | (2006.01) |
| *H01R 31/06* | (2006.01) |
| *H01R 13/516* | (2006.01) |
| *A45C 11/00* | (2006.01) |
| *H01R 13/52* | (2006.01) |
| *H01R 13/502* | (2006.01) |

(52) U.S. Cl.
CPC ......... *H01R 13/6205* (2013.01); *A45C 11/00* (2013.01); *H01R 13/516* (2013.01); *H01R 31/06* (2013.01); *A45C 2011/002* (2013.01); *A45C 2011/003* (2013.01); *G06F 1/1626* (2013.01); *H01R 13/502* (2013.01); *H01R 13/5202* (2013.01); *H01R 2201/06* (2013.01); *H04B 1/3888* (2013.01)

(58) Field of Classification Search
CPC .. H01R 13/6205; H01R 13/516; H01R 31/06; H01R 13/502; H01R 13/5202; H01R 2201/06; A45C 11/00; A45C 2011/002; A45C 2011/003; G06F 1/1626; H04B 1/3888
See application file for complete search history.

(56) References Cited

U.S. PATENT DOCUMENTS

| | | | | |
|---|---|---|---|---|
| 2020/0274573 | A1* | 8/2020 | Marcum | H04B 1/3888 |
| 2021/0164610 | A1* | 6/2021 | Roth | F16M 11/041 |
| 2021/0328394 | A1* | 10/2021 | Carnevali | H01R 33/94 |

* cited by examiner

*Primary Examiner* — Michael C Zarroli

(57) ABSTRACT

An electron-device protection casing using magnetic connection includes a protection casing for receiving a tablet form electronic device; a device end connecting unit installed in the protection casing for being connected to the electronic device. The device end connecting unit further includes at least one device end magnetic unit which is positioned in the body; the device end magnetic unit serves to be magnetically connected to an external device so that the external connecting unit can be fixedly connected to the external device. The present invention further includes an intermediate connecting unit which further has at least one intermediate magnetic unit positioned for being magnetically connected to the device end magnetic unit; the positions of the device end magnetic units are corresponding to those of the intermediate magnetic units so that the device end magnetic units are attracted by the intermediate magnetic unit.

12 Claims, 7 Drawing Sheets

ELECTRON-DEVICE PROTECTION CASING USING MAGNETIC CONNECTION

FIELD OF THE INVENTION

The present invention is related to electronic connection, and in particular to an electron-device protection casing using magnetic connection.

BACKGROUND OF THE INVENTION

In order to transfer signals or electric power of tablet form electronic devices (such as cell phone, tablet computer, notebook and PDA) to outer side, the protection casing of a tablet electronic device has a device end connector which serves to be connected to the electronic device placed in an interior of the electronic protection casing for protecting the electronic device within the protection casing, Another side of the device end connector is connected with an external connector, so the tablet electronic devices can communicate through the external connector.

The device end connector and external connector are the main connector. Usually they form a female connector and a male connector. This connecting way must have a mechanical insertion unit, but it often causes that the connecting ends exposes barely. It is easily to vibrate when in the connector sets, and the plug operation causes that the connectors loose or are destroyed with the lifetime. However, this will affect transfer of electronic power or signals and cause that the electronic devices in the protection casing cannot communicate with the external devices.

To improve the defects above mentioned, the present invention provides a new electronic device protection casing with magnetic units to solve the defects of present technologies mentioned.

SUMMARY OF THE INVENTION

Accordingly, the object of the present invention is to provide a electron-device protection casing using magnetic connection function, wherein the protection casing of the electronic device is equipped with a device end connecting unit. One end of the device end connecting unit is connected to the electronic device and another end thereof is connected to a matched intermediate connecting unit. The device end connecting unit and the intermediate connecting unit are connected magnetically. Therefore, the whole operation is easy, simple, and quick. The connection parts of the device end connecting unit and the intermediate connecting unit are formed matched male joint and female joint which can be connected quickly. In the present invention, the connecting mechanism is easier than other conventional design and is well protected which cannot be destroyed easily. As a result, the structure of the present invention has a longer lifetime. Furthermore the intermediate connecting unit may be installed with various kinds of external devices. Therefore, when the protection casing is connected to the external device through the device end connecting unit and the intermediate connecting unit, the present invention can be applied to various application.

An electron-device protection casing using magnetic connection, comprises a protection casing being a hollow structure for receiving a tablet form electronic device; the protection casing having a first through hole at one side thereof; a device end connecting unit installed within the first through hole of the protection casing for being connected to the electronic device so that the power or signals of the electronic device is connected to external devices through the device end connecting unit, the device end connecting unit including an internal connecting unit, an external connecting unit and a body; the internal connecting unit being electrically or signally connected to the external connecting unit; the internal connecting unit and the external connecting unit being installed in the body; wherein after installation, the internal connecting unit is positioned within the protection casing and the external connecting unit is positioned at an outer side of the protection casing; the internal connecting unit serving be connected to a connector of the electronic device; and the external connecting unit serving to be connected to an external device; and wherein the device end connecting unit further includes at least one device end magnetic unit which is positioned in the body; the device end magnetic unit serves to be magnetically connected to an external device so that the external connecting unit can be fixedly connected to the external device.

Furthermore, the present invention further comprises an intermediate connecting unit including an intermediate connector, an outer connector and a seat, the intermediate connector and the outer connector being installed on the seat; the external connecting unit of the device end connecting unit serving to be connected to the intermediate connector of the intermediate connecting unit; the outer connector being electrically or signally connected to the intermediate connector; the outer connector serving to be connected to the external device; and the intermediate connecting unit further including at least one intermediate magnetic unit positioned in the seat for being magnetically connected to the device end magnetic unit of the device end connecting unit; the positions of the device end magnetic units of the device end connecting unit are corresponding to those of the intermediate magnetic units of the intermediate connecting unit so that the device end magnetic units are attracted by the intermediate magnetic unit.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 9, the structure of the present invention is illustrated. The present invention includes the following elements.

A protection casing 20 is a hollow structure for receiving a tablet form electronic device 1. The electronic device 1 is one of handsets, tablet computers, notebook computers, PDAs, etc. The protection casing 20 has a first through hole 21 at one side thereof.

Figure 1:
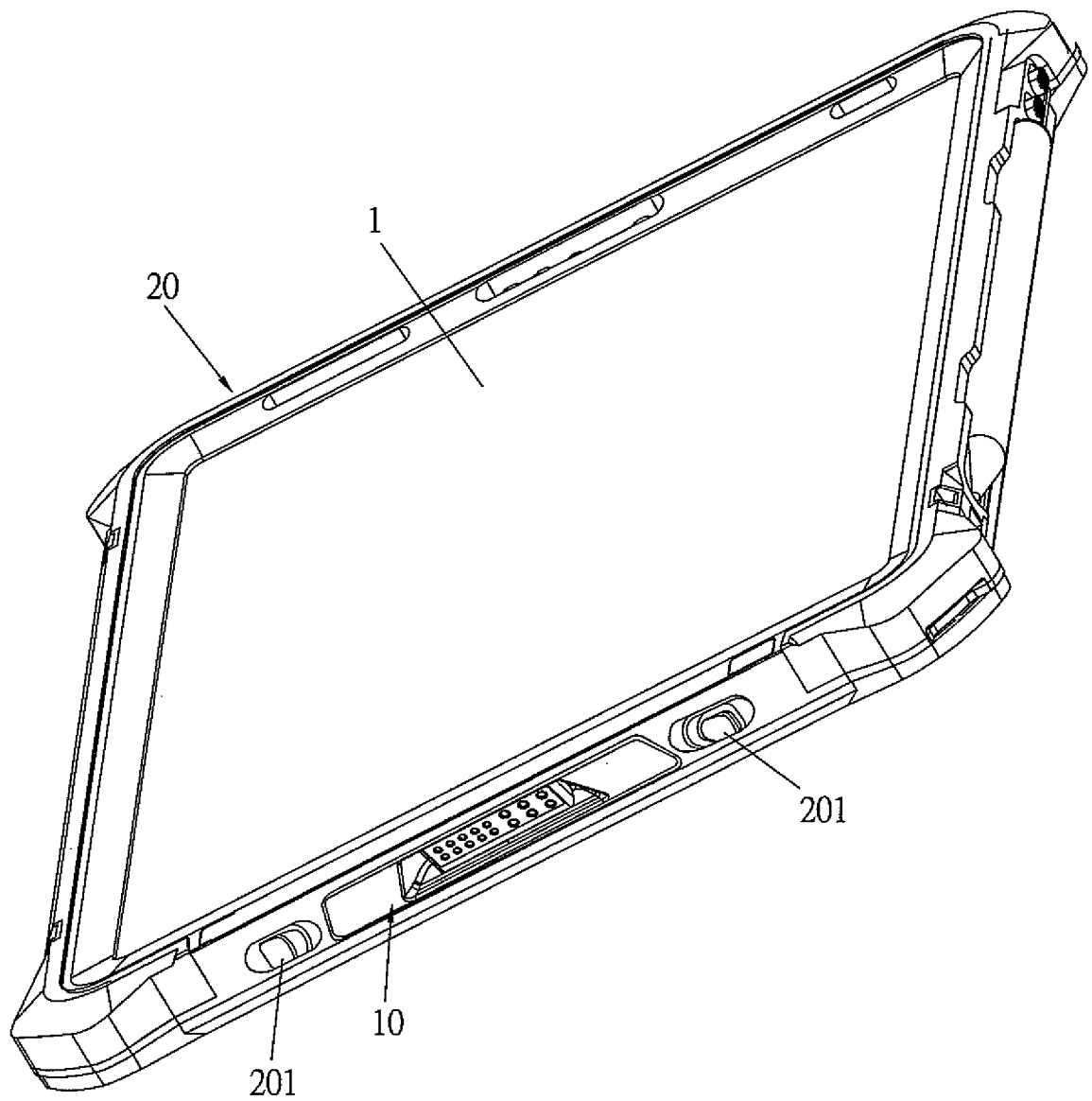
FIG. 1 is a schematic view of the present invention.
Figure 5:
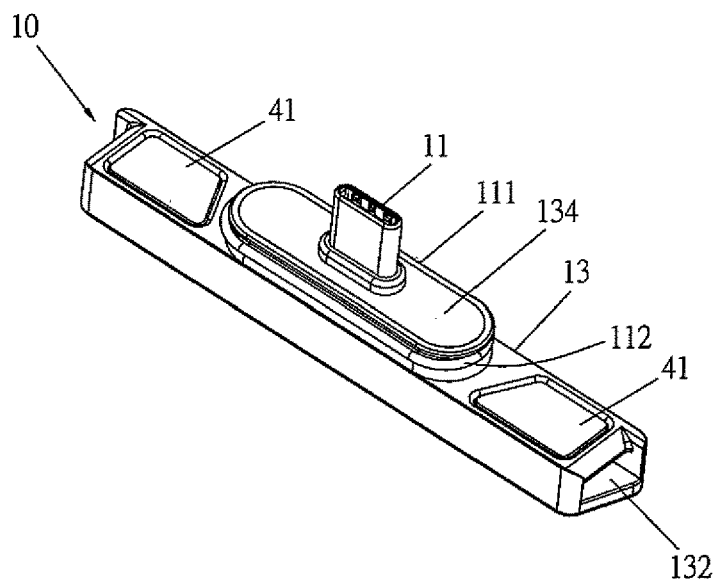
FIG. 5 is a schematic view showing the device end connecting unit of the present invention.
Figure 8:
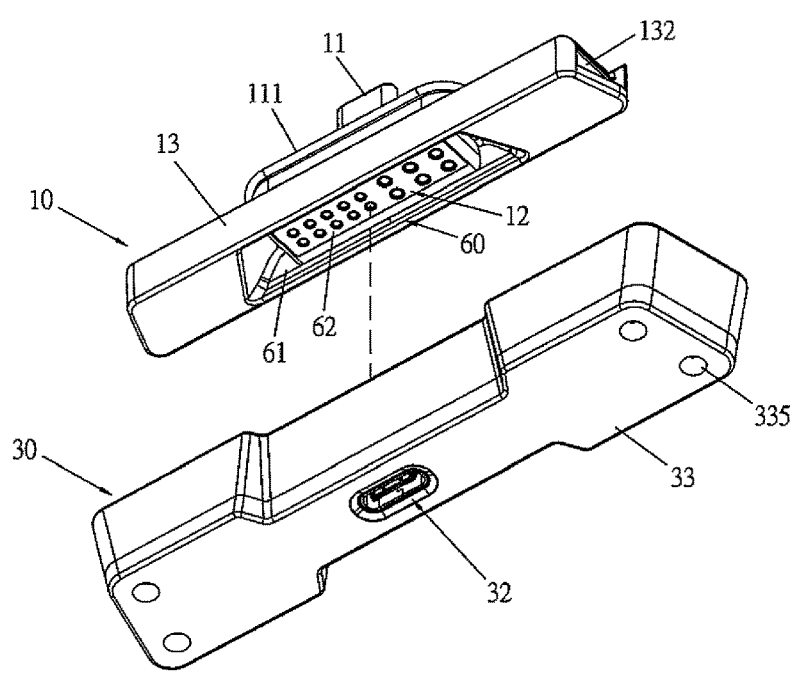
FIG. 8 is a schematic view about the device end connecting unit and the intermediate connecting unit of the present invention.

A device end connecting unit 10 is installed within the first through hole 21 of the protection casing 20, as illustrated in FIG. 1. The device end connecting unit 10 serves to be connected to the electronic device 1 so that the power or signals of the electronic device 1 is connected to external devices (not shown) through the device end connecting unit 10. Referring to FIGS. 5 and 8, the device end connecting unit 10 includes an internal connecting unit 11, an external connecting unit 12 and a body 13. The internal connecting unit 11 is electrically or signally connected to the external connecting unit 12. The internal connecting unit 11 and the external connecting unit 12 are installed in the body 13. After installation, the internal connecting unit 11 is positioned within the protection casing 20 and the external connecting unit 12 is positioned at an outer side of the protection casing 20. The internal connecting unit 11 serves to be connected to a connector 3 of the electronic device 1; and the external connecting unit 12 serves to be connected to an external device (not shown). The body 13 has a long shape.

The device end connecting unit 10 further includes at least one device end magnetic unit 41 which is positioned in the body 13. The device end magnetic unit 41 serves to be magnetically connected to an external device (not shown) so that the external connecting unit 12 can be fixedly connected to the external device.

Figure 2:
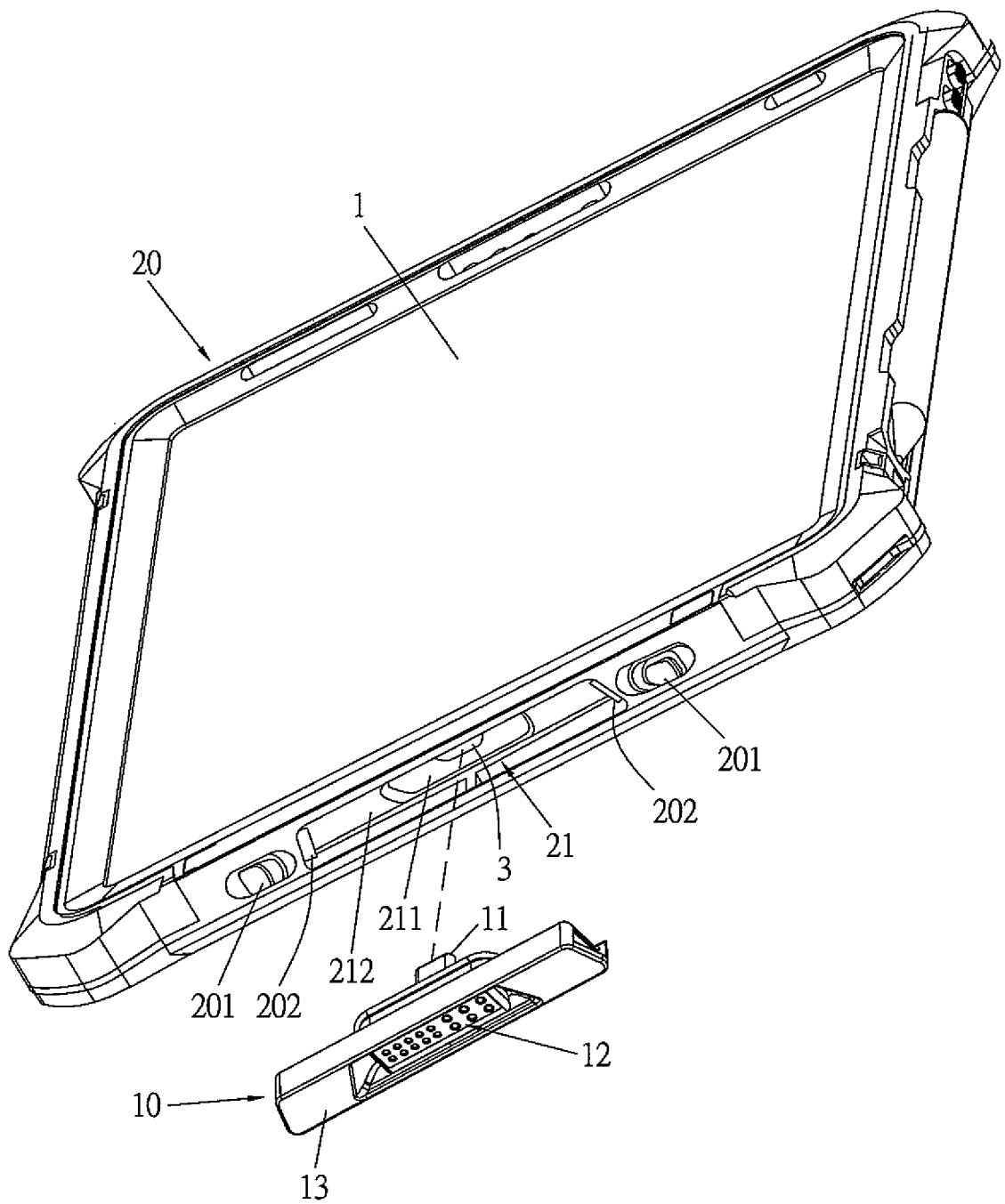
FIG. 2 is another schematic view of the present invention.
Figure 9:
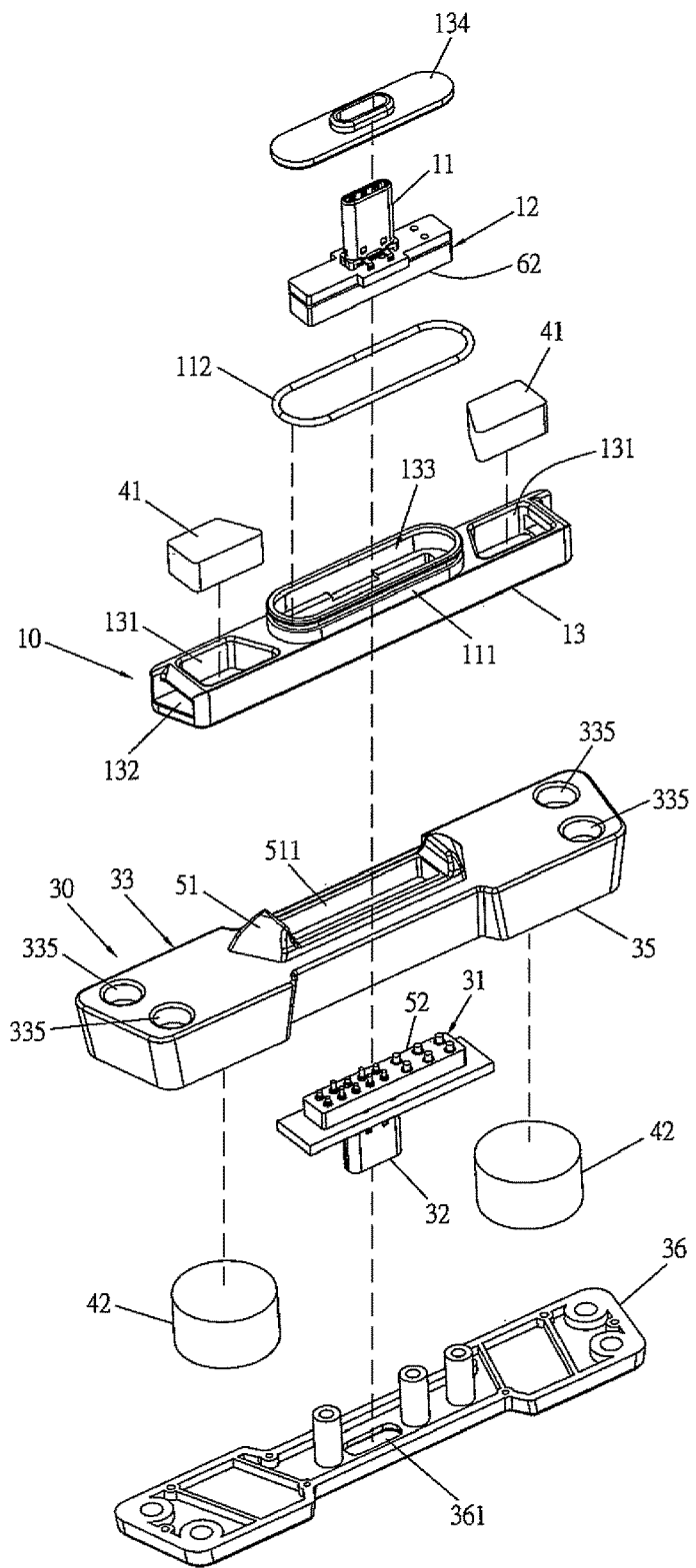
FIG. 9 is an exploded schematic view about the device end connecting unit and the intermediate connecting unit of the present invention.

With reference to FIGS. 2 and 9, the body 13 of the device end connecting unit 10 has two connecting holes 132 at two distal ends thereof, respectively. The protection casing 20 is installed with removable buckles 201 located at two sides of the first through hole 21. An inner side of the removable buckle 201 serves to be buckled to the connecting hole 132 so that the device end connecting unit 10 is fixed to the protection casing 20. Preferably, the internal connecting unit 11 is a USB Type-C connector. The first through hole 21 of the protection casing 20 includes an inner hole 211 at an inner side thereof and an outer hole 212 at an outer side thereof. The outer hole 212 is larger than the inner hole 211. A lower periphery of the internal connecting unit 11 is formed with an expanded portion 111 for be embedded into the inner hole 211. A periphery of the expanded portion 111 is installed with an enclosing ring 112 for tightly sealing the inner hole 211. The body 13 of the device end connecting unit 10 is installed within the outer hole 212.

Figure 3:
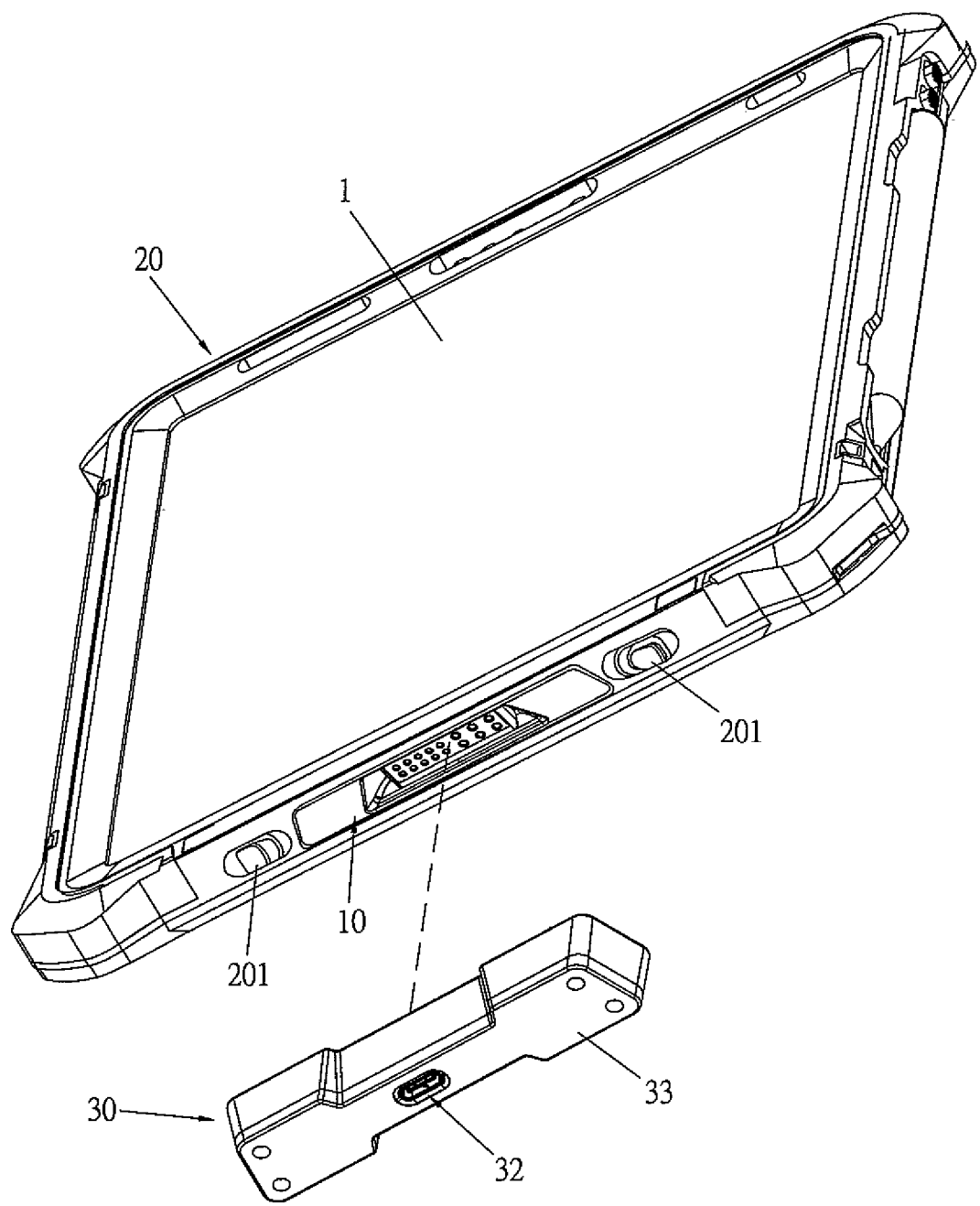
FIG. 3 is a further schematic view about the device end connecting unit and the intermediate connecting unit of the present invention.
Figure 4:
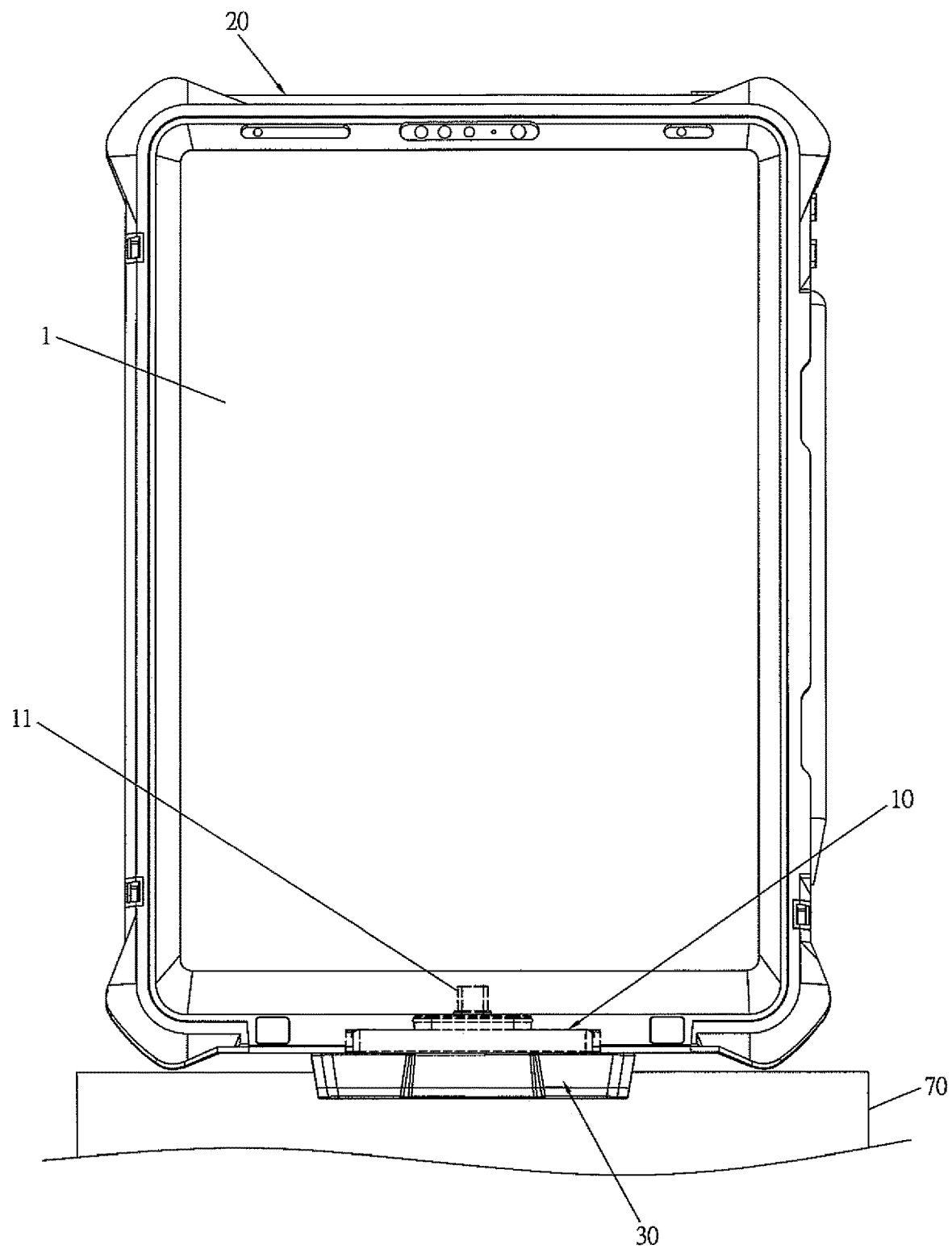
FIG. 4 is an application schematic view showing that the device end connecting unit is connected to the intermediate connecting unit according to the present invention.
Figure 6:
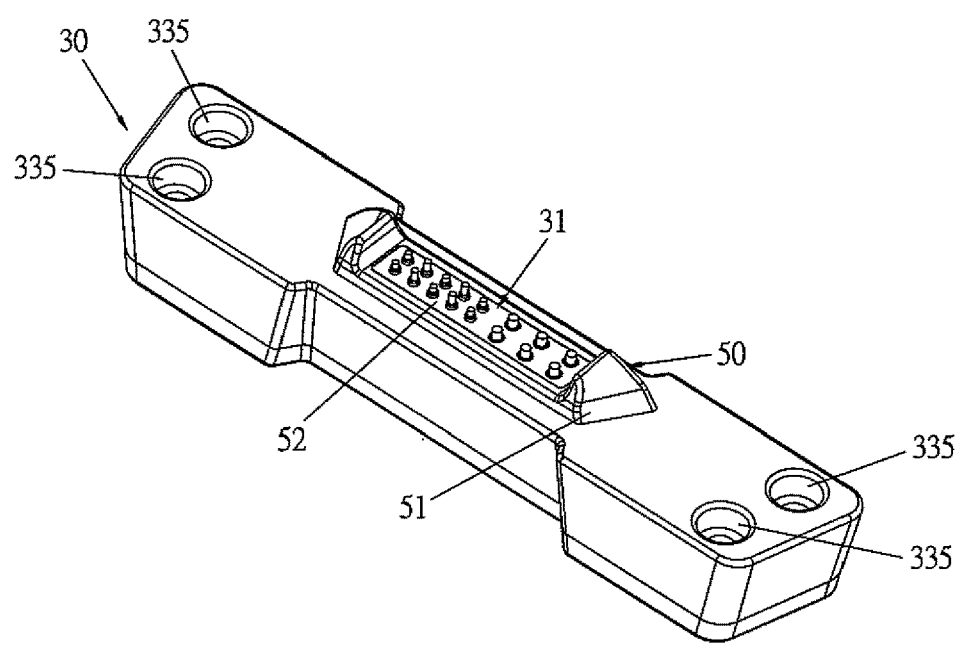
FIG. 6 is a schematic view showing the intermediate connecting unit of the present invention.
Figure 7:
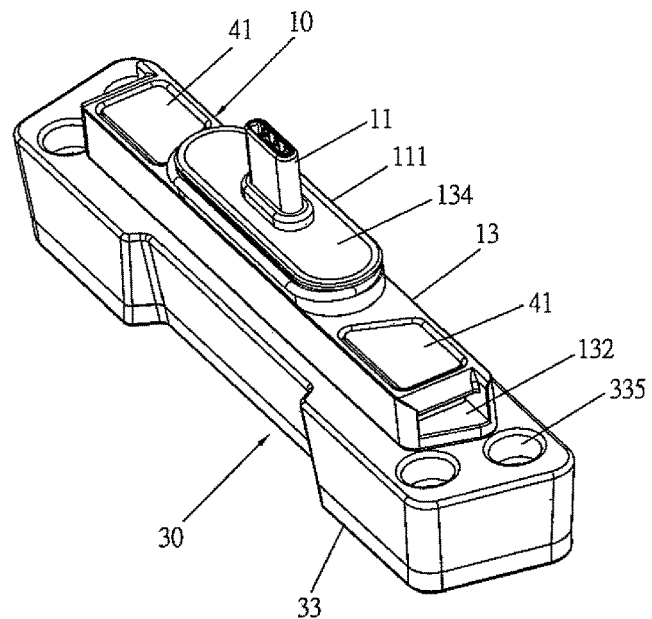
FIG. 7 is an assembled schematic view about the device end connecting unit and the intermediate connecting unit of the present invention.

An intermediate connecting unit 30 includes an intermediate connector 31, an outer connector 32 and a seat 33. With reference to FIGS. 6 and 8, the intermediate connector 31 and the outer connector 32 are installed on the seat 33. The external connecting unit 12 of the device end connecting unit 10 serves to be connected to the intermediate connector 31 of the intermediate connecting unit 30, as illustrated in FIGS. 3, 4 and 7. The outer connector 32 is electrically or signally connected to the intermediate connector 31. The outer connector 32 serves to be connected to the external device. Preferably, the outer connector 32 is a USB Type-C connector.

The intermediate connecting unit 30 includes at least one intermediate magnetic unit 42 positioned in the seat 33 for being magnetically connected to the device end magnetic unit 41 of the device end connecting unit 10. The positions of the device end magnetic units 41 of the device end connecting unit 10 are corresponding to those of the intermediate magnetic units 42 of the intermediate connecting unit 30 so that the device end magnetic units 41 are attracted by the intermediate magnetic unit 42.

In the present invention, the at least one device end magnetic unit 41 of the device end connecting unit 10 is two device end magnetic units 31 which are position at two sides of the body 13. The at least one intermediate magnetic units 42 of the intermediate connecting unit 30 are two intermediate magnetic units 42 which are positioned at two sides of the seat 33.

In the present invention, at least one of the device end magnetic unit 41 and the intermediate magnetic unit 42 is a magnet. Preferably, the device end magnetic unit 41 is formed by magnetic material (such as iron) and the intermediate magnetic unit 42 is a magnet.

With reference to FIG. 9, the body 13 of the device end connecting unit 10 has two installing grooves 131 at two sides thereof for receiving the device end magnetic units 41. The internal connecting unit 11 and the external connecting unit 12 are positioned at the middle part of the body 13.

In the present invention, the forms of the external connecting unit 12 of the device end connecting unit 10 and the intermediate connector 31 of the intermediate connecting unit 30 may have any form as desired so that one of the external connecting unit 12 and the intermediate connector 31 is a male connector 50 and another is a female connector 60. With reference to FIGS. 6 and 8, it is illustrated that the external connecting unit 12 includes a connecting base 62 and a recess 61. The connecting base 62 is within the recess 60 so as to form as the female connector 60. The intermediate connector 31 includes a joint 52 and a protrusion 51. The protrusion 51 encloses an outer periphery of the joint 52 so as to form as a male connector 50. The shape of the protrusion 51 is matched to the recess 61. In combination, the protrusion 51 is embedded into the recess 61 so that the connecting base 62 is connected to the joint 52. The connecting base 62 serves to be electrically or signally connected the joint 52. Therefore, the user can install the device end connecting unit 10 to the intermediate connecting unit 30 easily. The operation is very easy and simple.

The internal connecting unit 11 and the external connecting unit 12 of the device end connecting unit 10 are installed in a second hole 133 of the body 13. The second hole 133 penetrates through the expanded portion 111. The internal connecting unit 11 exposes out of the second hole 133 and the expanded portion 111 has a cover 134 for sealing the second hole 133.

The seat 33 of the intermediate connecting unit 30 may be formed with a plurality of installing holes 335 for receiving the external device. The seat 33 of the intermediate connecting unit 30 includes an upper cover 35 and a lower cover 36 which can be connected to the upper cover 35. The protrusion 51 of the intermediate connecting unit 30 is at one side of the upper cover 35. A center portion of the protrusion 51 is installed with a through hole 511 for receiving the joint 52. One end of the outer connector 32 passes through one through hole 361 of the lower cover 36. After combination of the upper cover 35 and the lower cover 36, the intermediate magnetic units 42 of the intermediate connecting unit 30 are embedded therein.

With reference to FIG. 4, in the present invention, the intermediate connecting unit 30 may be installed with various kinds of external devices 70, which may be a converting frame, a supporting seat, and others (not shown) so the electronic device 1 is connected to the external device 70 through the device end connecting unit 10 and the intermediate connector 31 so as to be electrically or signally connected to the external device 70. FIG. 4 only shows a part of the external device 70 which is only used to explain the scope of the present invention, but not used to confine the scope of the present invention.

Advantages of the present invention are that the protection casing 20 of the electronic device 1 is equipped with a device end connecting unit 10. One end of the device end connecting unit 10 is connected to the electronic device 1 and another end thereof is connected to a matched intermediate connecting unit 30. The device end connecting unit 10 and the intermediate connecting unit 30 are connected magnetically. Therefore, the whole operation is easy, simple, and quick. The connection parts of the device end connecting unit 10 and the intermediate connecting unit 30 are formed matched male joint and female joint which can be connected quickly. In the present invention, the connecting mechanism is easier than other conventional design and is well protected which cannot be destroyed easily. As a result, the structure of the present invention has a longer lifetime. Furthermore the intermediate connecting unit 30 may be installed with various kinds of external devices. Therefore, when the protection casing 20 is connected to the external device through the device end connecting unit 10 and the intermediate connecting unit 30, the present invention can be applied to various application.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electronic device electron-device protection casing using magnetic connection, comprising:
    a protection casing being a hollow structure for receiving a tablet form electronic device; the protection casing having a first through hole at one side thereof;
    a device end connecting unit installed within the first through hole of the protection casing for being connected to the electronic device so that the power or signals of the electronic device is connected to external devices through the device end connecting unit, the device end connecting unit including an internal connecting unit, an external connecting unit and a body; the internal connecting unit being electrically or signally connected to the external connecting unit; the internal connecting unit and the external connecting unit being installed in the body; wherein the internal connecting unit is positioned within the protection casing and the external connecting unit is positioned at an outer side of the protection casing; the internal connecting unit to be connected to a connector of the electronic device; and the external connecting unit serving to be connected to an external device; and
    wherein the device end connecting unit further includes at least one device end magnetic unit which is positioned in the body; the device end magnetic unit serves to be magnetically connected to an external device so that the external connecting unit can be fixedly connected to the external device;
    an intermediate connecting unit including an intermediate connector, an outer connector and a seat, the intermediate connector and the outer connector being installed on the seat; the external connecting unit of the device end connecting unit serving to be connected to the intermediate connector of the intermediate connecting unit; the outer connector being power or signally connected to the intermediate connector; the outer connector serving to be connected to the external device; and
    the intermediate connecting unit further including at least one intermediate magnetic unit positioned in the seat for being magnetically connected to the device end magnetic unit of the device end connecting unit; the positions of the device end magnetic units of the device end connecting unit are corresponding to those of the intermediate magnetic units of the intermediate connecting unit so that the device end magnetic units are attracted by the intermediate magnetic unit.

2. The electronic device protection casing using magnetic connection as claimed in claim 1, wherein at least one of the device end magnetic unit and the intermediate magnetic unit is magnets.

3. The electronic device protection casing using magnetic connection as claimed in claim 1, wherein the device end magnetic unit is formed of magnetic material and the intermediate magnetic unit is a magnet.

4. The electronic device protection casing using magnetic connection as claimed in claim 1, wherein the at least one device end magnetic unit of the device end connecting unit is two device end magnetic units which are position at two sides of the body; the at least one intermediate magnetic units of the intermediate connecting unit are two intermediate magnetic units which are positioned at two sides of the seat.

5. The electronic device protection casing using magnetic connection as claimed in claim 1, wherein the body of the device end connecting unit has two connecting holes at two distal ends thereof, respectively; the protection casing is installed with removable buckles located at two sides of the first through hole; an inner side of the removable buckle serves to be buckled to the connecting hole so that the device end connecting unit is fixed to the protection casing.

6. The electronic device protection casing using magnetic connection as claimed in claim 1, wherein the first through hole of the protection casing includes an inner hole at an inner side thereof and an outer hole at an outer side thereof; the outer hole is larger than the inner hole; a lower periphery of the internal connecting unit is formed with an expanded portion for be embedded into the inner hole; and the body of the device end connecting unit is installed within the outer hole.

7. The electronic device protection casing using magnetic connection as claimed in claim 1, wherein the body of the device end connecting unit has two installing grooves at two sides thereof for receiving the device end magnetic units; and the internal connecting unit and the external connecting unit are positioned at a middle part of the body.

8. The electronic device protection casing using magnetic connection as claimed in claim 1, wherein the external connecting unit includes a connecting base and a recess; the connecting base is within the recess so as to form as the female connector; the intermediate connector includes a joint and a protrusion; the protrusion encloses an outer periphery of the joint so as to form as a male connector; the shape of the protrusion is matched to the recess; wherein in combination, the protrusion is embedded into the recess so that the connecting base is connected to the joint; and the connecting base serves to be power or signally connected the joint.

9. The electronic device protection casing using magnetic connection as claimed in claim 6, wherein a periphery of the expanded portion is installed with an enclosing ring for tightly sealing the inner hole; and the internal connecting unit and the external connecting unit of the device end connecting unit are installed in a second hole of the body; the second hole penetrates through the expanded portion; and the internal connecting unit exposes out of the second hole and the expanded portion has a cover for sealing the second hole.

10. The electronic device protection casing using magnetic connection as claimed in claim 1, wherein the seat of the intermediate connecting unit is formed with a plurality of installing holes for receiving the external device.

11. The electronic device protection casing using magnetic connection as claimed in claim 9, wherein the seat of the intermediate connecting unit includes an upper cover and a lower cover which can be connected to the upper cover; the protrusion of the intermediate connecting unit is at one side of the upper cover; a center portion of the protrusion is installed with a through hole for receiving the joint; one end of the outer connector passes through one through hole of the lower cover; after combination of the upper cover and the lower cover, the intermediate magnetic units of the intermediate connecting unit are embedded therein.

12. The electronic device electron device protection casing using magnetic connection as claimed in claim 1, wherein the electronic device is one of mobile phones, tablet computers, notebook computers, and PDAs.

* * * * *